Feb. 16, 1932.  G. A. DAVIDSON  1,845,247

GAS TESTING DEVICE

Filed March 7, 1927

Inventor
George A. Davidson
By Lyon & Lyon
Attorneys

Patented Feb. 16, 1932

1,845,247

UNITED STATES PATENT OFFICE

GEORGE A. DAVIDSON, OF RICHMOND, CALIFORNIA, ASSIGNOR TO STANDARD OIL COMPANY OF CALIFORNIA, OF SAN FRANCISCO, CALIFORNIA, A CORPORATION OF DELAWARE

GAS TESTING DEVICE

Application filed March 7, 1927. Serial No. 173,324.

This invention relates to a testing device or apparatus which is intended to be used for testing gases to determine the amount of condensible vapors contained in them. While the apparatus may be used for any specific purpose, it is expected to be particularly useful when employed to determine the amount of gasoline carried in natural gas or other gas. For example, the device may be used for determining the efficiency of operation of absorption and compressor plants used for removing gasoline from natural gas. The general object of the invention is to provide a simple device or apparatus for the purposes stated; also to construct the device in such a way as to increase the efficiency of the heat exchange in effecting the condensation of vapors carried in the gas; also to provide a refrigerating medium having a composition which will insure effective contact of the refrigerating medium with the wall which separates the gas from it and to increase the efficiency of the heat exchange; also to provide a construction which will tend to prevent the out flowing current of gas from carrying away condensed globules of liquid or gasoline condensed from the gas.

Further objects of the invention will appear hereinafter.

The invention consists of the novel parts and combination of parts to be described hereinafter, all of which contribute to produce an efficient gas testing device.

A preferred embodiment of the invention is described in the following specification, while the broad scope of the invention is pointed out in the appended claims.

In practicing the invention, I provide a container for a refrigerating medium and associated with this container I provide a cooler which is removably mounted in the container and which extends down into the refrigerant or refrigerating medium. I prefer to construct this cooler with an inducting conduit for conducting the gas down into the interior of the cooler and with an educting conduit for conducting the gas out of the cooler or condenser.

These conduits are disposed in proximity to each other so that the reduced temperature of the outgoing gas in one of the conduits assists in extracting the heat from the incoming gas in the other conduit. Any suitable construction may be employed for attaining this effect.

Figure 1:
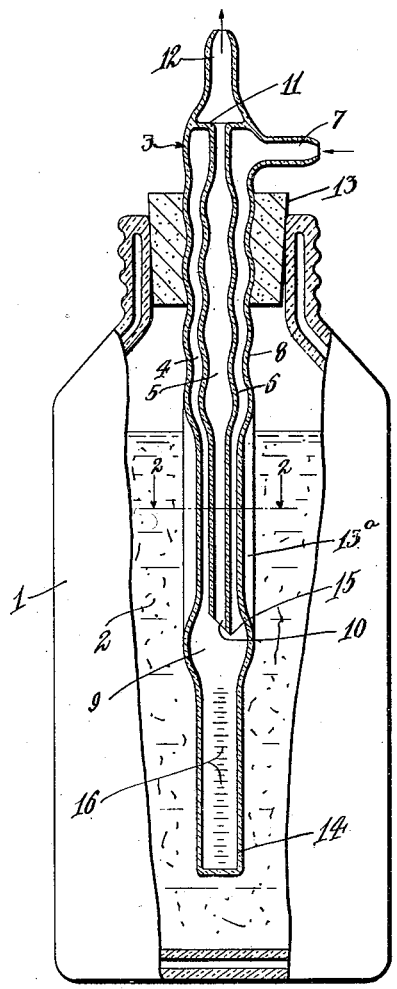
Figure 1 is a side elevation and partial section through a testing device embodying my invention.
Figure 2:
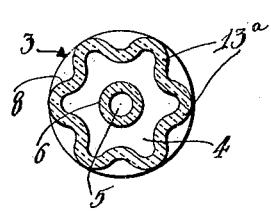
Figure 2 is a cross section taken about on the line 2—2, Figure 1.

In the preferred embodiment of the invention, see Figures 1 and 2, 1 represents a container and 2 represents a refrigerating medium within the container. The refrigerating medium is preferably such as to enable a very low temperature to be developed within the container, and for this purpose I prefer to employ a "slush" composed of carbon dioxide in a finely divided but solid state and known popularly as carbon dioxide "snow." In preparing this refrigerating medium, I fill the container about half full of this carbon dioxide and then I add ether to it. This produces a "slush" which will have a very low temperature and has the advantage that the ether being a liquid has a more intimate contact with the wall of the conduit for the gas than could be obtained merely by using the carbon dioxide snow. With this mixture I can readily attain temperatures ranging from zero to $-100°$ centigrade.

The gas is led off from a tank (not illustrated) and conducted through the refrigerating medium by means of a cooler 3. As illustrated in Figure 1, the cooler is of tubular cross-section and comprises an inducting conduit 4 which is of annular form and surrounds an inner educting condit 5 as a jacket from which it is separated by a single dividing wall 6. The gas to be tested is admitted through a nipple 7 at the upper end of the cooler and a flow is effected downwardly on the inner side of the outer wall 8 of the cooler. Near the lower end of the cooler it is slightly enlarged to form a rudimentary chamber or bulb 9 at which the lower end or mouth 10 of the inner tube 5 is located. Just above the inlet nipple 7 a transverse head 11 is provided which closes the upper end of the annular duct so that the gas must all pass down into the chamber 9 to enter the tube 5 through which the gas passes upwardly in leaving the condenser, eventually finding exit through an outlet nipple 12.

If desired, this cooler may be supported in a removable closure or stopper 13 seated in the mouth of the container. The container is preferably constructed of a double wall and hence an ordinary thermos bottle may be used for this purpose.

In order to increase the effectiveness of the device as a heat exchanger I construct the walls of the cooler so as to produce a turbulent flow of the gas. For this purpose, the walls may be given a wavy contour as indicated in the vertical section through the cooler in Figure 1.

In order to increase the area of the outer tube 8 which is exposed to the cooling medium, I prefer to form it with vertical convolutions 13a, see Figures 1 and 2. The cooler may be constructed of any desired material, but it is preferably formed of glass with very thin walls which favor the heat exchange.

The lower end of the cooler is formed into an elongated cup or "well" 14 which collects the liquids condensed in the cooler. In order to prevent as far as possible, the outgoing gas from carrying out condensed globules of liquid, I prefer to form the mouth 10 with a downwardly projecting lip 15 at one side. This may be produced by simply cutting the tube off in an inclined plane. With this form of mouth the globules tend to accumulate at the lip and fall off into the well.

If desired the well may be provided with graduations forming a scale 16 for indicating the quantity of liquid condensed.

Figure 3:
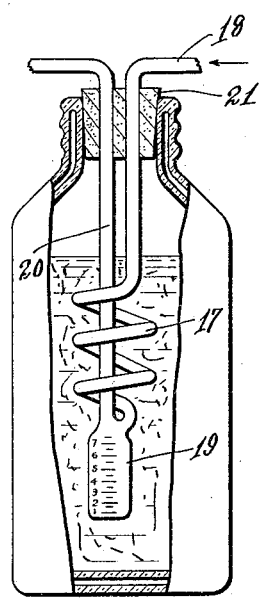
Figure 3 is a view similar to Figure 1 but showing another embodiment of the invention.

In the embodiment of the invention shown in Figure 3, the cooler may be constructed in the form of a coil 17, the upper end of which connects with the inlet 18 for the gas; the lower end of the coil connects to a well or cup 19 from which a straight outlet pipe 20 extends upwardly through the coil. In this way the pipe 20 and the coil 17 are made to communicate with each other above the cup 19. The tubes which form the inlet and outlet connections can be passed through the stopper 21 and bent thereafter.

The rate of flow of the gas through the cooler should not ordinarily exceed $1/20$ of a cubic foot per minute.

In practice, connections may be made to the tester shown in Figure 1, by means of rubber hose attached to the nipples 7 and 12.

It is understood that the embodiment of the invention described herein is only one of the many embodiments this invention may take, and I do not wish to be limited in the practice of the invention, nor in the claims, to the particular embodiment set forth.

What I claim is:

1. In a testing apparatus for determining the quantity of condensible vapors in a gas, the combination of a container for a refrigerating medium, a cooler removably mounted in the container and extending down into the refrigerating medium, said cooler having an inner duct for the gas and an annular duct surrounding the same with a wall separating said ducts operating to exchange heat between the incoming gas and outgoing gas, said cooler having convolutions in its wall to produce a turbulent flow of the gases, said cooler having a well at its lower end for collecting the condensates.

2. In a testing apparatus for determining the quantity of condensible vapors in a gas, the combination of a container for a refrigerating medium, a cooler removably mounted in the container and extending down into the refrigerating medium, said cooler having an inner duct for the gas and an annular duct surrounding the same with a wall separating said ducts operating to exchange heat between the incoming gas and outgoing gas, said cooler having convolutions in its wall to produce a turbulent flow of the gases, the outer wall of said cooler having convolutions to increase the area exposed to contact with the refrigerating medium, said cooler having a well at its lower end for collecting the condensates.

3. In a testing apparatus for determining the quantity of condensible vapor in a gas, the combination of a container for a refrigerating medium, a cooler removably mounted in the container and extending down into the container, said cooler having an inducting conduit for conducting the gas into the interior of the same and having an educting conduit for conducting the gas out of the cooler, said cooler having a single wall separating the inducting conduit from the educting conduit, with the inducting conduit located between the refrigerant and the educting conduit, whereby the reduced temperature of the outgoing gas in the educting conduit assists in extracting heat from the incoming gas in the other conduit, and a well at the lower end of the cooler for collecting the condensed vapors, said well having graduations thereon for indicating the amount of condensed liquid.

Signed at Richmond this 24th day of February, 1927.

GEORGE A. DAVIDSON.